358-140. OR 2,960,566 SR

SEARCH ROOM

TELEVISION STANDARDS CONVERSION SYSTEM

Filed June 8, 1959

T5055

SKIPWITH W. ATHEY
*INVENTOR.*

BY Flehr and Swain
ATTORNEYS

United States Patent Office 2,960,566
Patented Nov. 15, 1960

2,960,566

TELEVISION STANDARDS CONVERSION SYSTEM

Skipwith W. Athey, Portola Valley, Calif., assignor to Ampex Corporation, Redwood City, Calif., a corporation of California Filed June 8, 1959, Ser. No. 818,825

10 Claims. (Cl. 178—6)

This invention relates generally to a standards conversion system and method and more particularly to a television standards conversion system and method employing an intermediate television system.

By television standards conversion is meant the processing of a television signal derived under a given set of line and frame standards in such a way that it may be broadcast and received by receivers which operate under a different set of line and frame standards.

As is well known, at least six sets of television standards have been adopted in various parts of the world. For example, the United States standard includes 525 lines per frame with 30 frames per second. Great Britain's standard includes 405 lines per frame, 25 frames per second. Germany, France and other countries each have adopted different sets of standards. Television standards conversion is desirable if there is to be wider international cooperation in the arts and entertainment. Television standards conversion is also important in commercial pursuits which involve production of television programs in one country for broadcasting in another country as well as in the country of origin. A television recording, for example, a magnetic recording, may be produced under one set of standards and then shipped to another country where the standard is converted to the new line and frame rate for broadcast and reception in that country.

One suggested standards conversion method is to form a display of the information, such as on a monitor or receiver picture tube, and to scan the display with a system having the desired set of standards. However, it is apparent that since the line and frame rates are different under different sets of standards that a moiré or beat pattern will result which will deteriorate the signal.

It is a general object of the present invention to provide an electro-optical standards conversion system and method.

It is another object of the present invention to provide a standards conversion system and method in which two television systems are interposed between the incoming signal in one set of standards, and the outgoing signal in another set of standards.

It is a further object of the present invention to provide a television standards conversion system and method in which the signal in one set of standards is displayed by scanning in one direction, the display is viewed by a camera scanning in a direction at right angles, the new information derived by the camera scanning in the direction at right angles is displayed in such a manner that the picture has no original scanning line structure and the second display is viewed with a camera operating under the desired set of standards.

These and other objects of the present invention will become more clearly apparent from the following description when taken in conjunction with the accompanying drawing.

Referring to the drawing.

Figure 1:
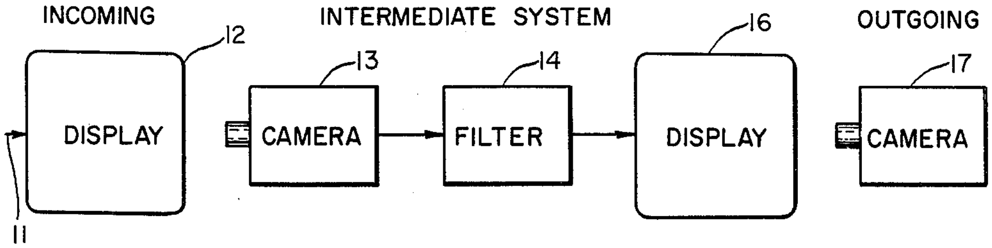
Figure 1 is a schematic block diagram showing a television conversion system in accordance with the present invention.
Figure 3:
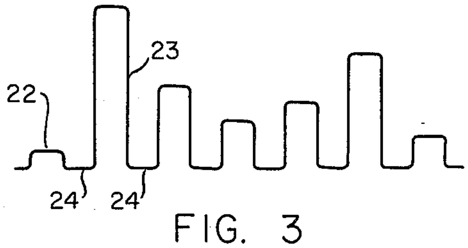
Figure 4:
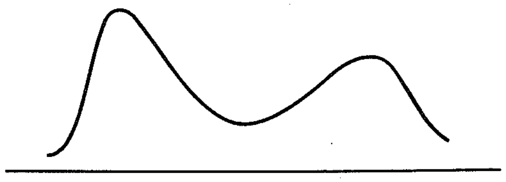
Figure 5:
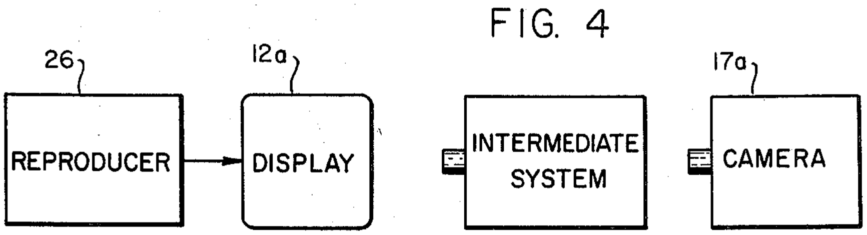

Figure 3 schematically illustrates the waveshape of the output signal from the first camera in the system of Figure 1;

Figure 4 schematically illustrates the waveshape of the output signal after it is passed through the filter of the intermediate system of Figure 1; and Figure 5 shows a standards conversion system of the type shown in Figure 1 employed in conjunction with a reproducing apparatus.

The incoming signal having one set of standards is applied along the line 11 to a television receiver and is displayed on the screen 12 of the receiver by scanning in one direction. Preferably, the receiver is a precision receiver or monitor adapted to receive and display the signal having the incoming set of standards.

The screen 12 is viewed by a high definition camera 13 which forms part of an intermediate television system. The camera 13 is adapted to scan the screen 12 at an angle, preferably right angle, with respect to the scanning which formed the display. The output of the camera is applied to a filter 14 and then to another precision receiver or monitor which forms a display on screen 16. The intermediate system has an aspect ratio inverted with respect to the incoming picture and an extremely wide electrical transmission band.

The display on the screen 16 is observed by another high resolution camera 17 which operates under the desired standards. The output of the camera is then suitably processed to form a composite video signal.

The frame rate of the intermediate system can be chosen to fit either the incoming or outgoing signal. The line number is preferably chosen to be greater than the number of half cycles along a horizontal line in the incoming signal divided by the Kell factor. For example, if 250 cycles (500 half cycles) are displayed along a line of the incoming signal, the intermediate television system has an active line number of 500 divided by .7, or something more than 700 lines. This assures that the space quantizing effect of scanning the horizontal lines with another line system will not degrade the image. The Kell factor referred to here is in effect a measure of the relative ability of a set of lines in fixed positions and a set of half cycles of variable position to produce the effect of subjective sharpness. Because it is a subjective measure partly dependent on viewing distance, its value for this system may differ from the 0.7 usually accepted as correct for the U.S. TV system with 525 lines when viewed at an average distance of 4 times the picture height.

Figure 2:
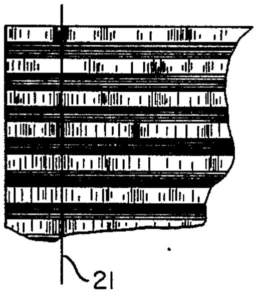
Figure 2 is an enlarged view of a small section of the incoming display screen of Figure 1.

Figure 2 shows an enlarged view of a portion of the display on screen 12. The vertical line 21 indicates a vertical scan line. The waveshape of the signal from camera 13 is shown in Figure 3 and comprises spikes 22 corresponding to black lines and spikes 23 corresponding to white lines with intermediate shades of grey being depicted by spikes of intermediate size. The area 24 between spikes represents the area between horizontal lines of the display.

The sharpest vertical black to white transition in the incoming display is obtained when one line is white and the next line is black. For these conditions, the frequency of the wave shown in Figure 3 is twice the frequency of the sinewave signal corresponding to the fastest possible change from black to white.

Assuming that the repetition frequency of the spikes which represents signals from the individual lines of the initial system is 2F in the intermediate system, then the filter 14 is selected to have a cut-off frequency slightly above the frequency F. This technique is precisely the technique of sampling a signal of bandwidth F while a sampling frequency 2F, and then recovering the input signal perfectly by filtering out everything above the frequency F. The intermediate system must also transmit video signal components up to this frequency.

The output of the filter when applied to the intermediate receiver or monitor and displayed on the screen 16 will show a picture which has none of the incoming scanning line structure but which has vertical brightness transitions that are as sharp as those produced by the incoming system. The waveshape of the output signal from filter 14 is indicated in Figure 4. It is seen that the flat portions 24 have been removed by the filtering and that the various spikes have been rounded off to present a smooth waveshape for application to the precision monitor of the intermediate system.

When the display on screen 16 is observed by the outgoing television system, no moiré or beat pattern can exist because of the difference in line numbers of the two systems. The line number of the intermediate system must be high enough so that the appropriate Kell factor ratio in relation to a half cycle is also true for it relative to the outgoing system. It is observed that the vertical scan system puts the elements which make the moiré or beat pattern arise because of different line numbers into a frequency range which can be easily filtered.

Referring to Figure 5, a system of the type described is shown in conjunction with a reproducing apparatus 26. The reproducing apparatus may be a magnetic tape apparatus which is adapted to reproduce magnetic tape recordings of video information such as television signals. The apparatus serves to reproduce the signals and to transmit the same to the display monitor including screen 12*a*. The display is scanned by an intermediate television system similar to the intermediate system of Figure 1. The display of the intermediate system is scanned by the camera 17*a* which is operating under the new set of standards. A television recording made under one of standards is reproduced and converted to a new set of standards.

Thus, it is seen that there is provided an improved standards conversion system. The system minimizes moiré or beat patterns by placing them in an easily filtered frequency range.

I claim:

1. A television standards converter comprising means serving to receive a television signal in one set of standards and serving to form a first display, having a scanning line structure in one direction, an intermediate system including means for viewing said display and forming a new display, having a scanning line structure in the opposite direction and none of the original scanning line structure, and means serving to view the new display in a new set of standards to provide an output signal in the new set of standards.

2. A television standards converter comprising means serving to receive a television signal in one set of standards and serving to form a first display comprising a plurality of adjacent scan lines disposed in one direction, means for scanning said display in a direction perpendicular to the direction of said scan lines, means for receiving the output of said scanning means and serving to form a second display corresponding to the output of the scanning means, said second display having none of the original scanning structure and means serving to view the second display in a new set of standards and provide an output signal in the new set of standards.

3. A television standards converter comprising means serving to receive a television signal in one set of standards and serving to form a first display comprising a plurality of adjacent lines disposed in one direction, an intermediate system including means for scanning said display in a direction perpendicular to said direction and forming an output signal, filter means adapted to receive said output signal, means serving to receive said filtered signal and form a second display, and means serving to view the second display in a new set of standards and provide an output signal in the new set of standards.

4. A television standards converter comprising means serving to receive a television signal in one set of standards and serving to form a first display comprising a plurality of adjacent lines disposed in one direction, an intermediate system having an inverted aspect ratio including means for scanning said display in a direction perpendicular to said direction and serving to form a new display, and means serving to view the second display in a new set of standards and provide an output signal in the new set of standards.

5. A television standards converter comprising means serving to receive a television signal in one set of standards and serving to form a first display comprising a plurality of adjacent lines disposed in one direction, each of said lines serving to display a predetermined number of half cycles, an intermediate system including means for scanning said display in a direcsion perpendicular to said one direction and serving to form a new display, said intermediate system having an active line number equal to the number of half cycles in a line of the incoming system divided by the appropriate Kell factor, and means serving to view the second display in a new set of standards and provide an output signal in said new set of standards.

6. A system of the type adapted to reproduce a television recording formed in one set of standards and convert the same to a new set of standards comprising reproducing apparatus serving to reproduce the recordings to form a television signal in said one set of standards, means serving to receive a television signal in one set of standards and serving to form a first display comprising a plurality of adjacent scan lines disposed in one direction, means for scanning said display in a direction perpendicular to the direction of said scan lines, means for receiving the output of said scanning means and serving to form a second display corresponding to the output of the scanning means, and means serving to view the second display in a new set of standards and provide an output signal in the new set of standards.

7. A system of the type adapted to reproduce a television recording formed in one set of standards and convert the same to a new set of standards comprising reproducing apparatus serving to reproduce the recording to form a television signal in said one set of standards, means serving to receive a television signal in one set of standards and serving to form a first display comprising a plurality of adjacent lines disposed in one direction, an intermediate system including means for scanning said display in a direction perpendicular to said direction and forming an output signal, filter means adapted to receive said output signal, means serving to receive said filtered signal and form a second display having none of the original scan line structure, and means serving to view the second display in a new set of standards and provide an output signal in the new set of standards.

8. A system for converting a television signal from one set of standards to another which comprises means for displaying the signal in one set of standards with scan line structure in a given direction, means for scanning said display in an opposite direction to form a new signal, means for displaying the new signal on a screen, and means for scanning the display of the new signal under the other set of standards.

9. A system as in claim 8 wherein said second display does not have any line structure corresponding to the scanning lines of the incoming signal.

10. A television standards converter comprising means serving to receive a television signal in one set of standards and serving to form a first display having a scanning line structure in one direction, an intermediate system including means for scanning the display in an opposite direction to form a new signal, said new signal having a frequency 2F corresponding to the frequency of scanning of the individual scanning lines, filter means having a cut-off frequency slightly above the frequency F serving to receive said signal, means for receiving the output of the filter and forming a display having a scanning structure in the opposite direction which contains none of the original scanning structure, and means serving to view the new display in a new set of standards to provide an output signal in the new set of standards.

No references cited.